United States Patent [19]

Baranet et al.

[11] Patent Number: 4,686,052

[45] Date of Patent: Aug. 11, 1987

[54] STABILIZED FRACTURE FLUID AND CROSSLINKER THEREFOR

[75] Inventors: Sandra E. Baranet, Broken Arrow; Richard M. Hodge, Sand Springs; Clare H. Kucera, Broken Arrow, all of Okla.

[73] Assignee: Dowell Schlumberger Incorporated, Tulsa, Okla.

[21] Appl. No.: 753,214

[22] Filed: Jul. 8, 1985

[51] Int. Cl.$^4$ ............................................. E21B 43/26
[52] U.S. Cl. .................................. 252/8.551; 166/308; 252/315.3; 556/6
[58] Field of Search ............ 252/8.55 R; 556/6, 315.3

[56] References Cited

U.S. PATENT DOCUMENTS

| 2,894,966 | 7/1959 | Russell | 556/6 X |
| 2,950,174 | 8/1960 | Lagally | 556/6 X |
| 3,301,723 | 1/1967 | Chrisp | 252/315.3 X |
| 3,888,312 | 6/1975 | Tiner et al. | 252/8.55 X |
| 3,974,077 | 8/1976 | Free | 252/8.55 |
| 4,460,751 | 7/1984 | Hanlon et al. | 252/8.55 X |
| 4,464,270 | 8/1984 | Hollenbeak et al. | 252/8.55 |
| 4,477,360 | 10/1984 | Almond | 252/8.55 |

*Primary Examiner*—Herbert B. Guynn
*Attorney, Agent, or Firm*—L. Wayne White

[57] ABSTRACT

Various organometallic crosslinkers containing titanium or zirconium atoms in the +4 oxidation (valence) state have been used to crosslink solvatable polysaccharides (e.g., hydroxypropyl guar) in aqueous media. The crosslinked gels are useful as fracturing fluids. Aqueous solutions of the organometallic crosslinkers are stabilized against deterioration upon storage by adding an alkanolamine (e.g., triethanolamine). Additionally, the alkanolamines also stabilize the crosslinked gels against shear degradation at elevated temperatures.

17 Claims, No Drawings

STABILIZED FRACTURE FLUID AND CROSSLINKER THEREFOR

BACKGROUND OF THE INVENTION

This invention pertains to stabilized aqueous zirconium and titanium crosslinking compositions for use with solvatable polysaccharides to form stabilized crosslinked gels. This invention also pertains to processes for using such gels as fracture fluids for fracturing subterranean formations.

The present invention includes a process for fracturing a subterranean formation penetrated by a wellbore which comprises the steps of:

(a) substantially continuously injecting a crosslinking amount of the composition of the invention into a flowing stream of an aqueous solvatable polysaccharide to thereby form a flowing crosslinkable fracturing fluid, (b) introducing said flowing crosslinkable fracturing fluid into the wellbore at a flow rate and pressure sufficient to permit said crosslinkable fracturing fluid to gel and increase in viscosity while it is passing through the borehole, and, (c) introducing said aqueous gelled fracturing fluid into said formation at a flow rate and pressure at least sufficient to create, reopen and/or extend a fracture in said formation.

Hydraulic fracturing is a term that has been applied to a variety of techniques used to stimulate the production of oil, gas and other fluids from subterranean formations. In hydraulic fracturing, suitable fracturing fluid is introduced into a subterranean formation by way of a wellbore under conditions of flow rate and pressure which are at least sufficient to create and/or extend a fracture into a desired part of the formation. The fracturing fluid normally carries with it a proppant (e.g., sand, bauxite, etc.) which is forced into the fracture itself and keeps the broken formation from closing down upon itself once the pressure is released.

Various fluids under pressure have been used in hydraulic fracturing. Most of the fracturing fluids used today are aqueous-based liquids which have been either gelled or foamed.

Aqueous gels are usually prepared by blending a polymeric gelling agent with an aqueous medium. Most frequently, the polymeric gelling agent of choice is a solvatable polysaccharide. These solvatable polysaccharides form a known class of compounds which include a variety of natural gums as well as certain cellulosic derivatives which have been rendered hydratable by virtue of hydrophilic substituents chemically attached to the polymer backbone. The solvatable polysaccharides therefore include galactomannan gums, glucomannan gums and cellulose derivatives. Examples of such polymers include guar, carboxyalkyl guar, hydroxyalkyl guar, and carboxyalkyl hydroxyalkyl guar, galactomannan gums, glucomannan gums, xanthan gums, and the like.

The solvatable polysaccharides have a remarkable capacity to thicken aqueous liquids. Even small amounts are sufficient to increase the viscosity of such aqueous liquids from 10 to 100 times or more. In many instances, the thickened aqueous liquid has sufficient viscosity to carry the proppant during the course of the fracturing process and represents a satisfactory fracturing fluid. In other instances, it is necessary to crosslink the polysaccharide in order to form a gel having sufficient strength and viscosity to carry out the proppant. A variety of crosslinkers have been developed to achieve this result.

The borate ion has been used extensively as a crosslinking agent for hydrated guar gums and other galactomannans to form aqueous gels used in fracturing and other areas. For example, Kern described a crosslinked system in U.S. Pat. 3,058,909 which was used extensively in the oil and gas industry as a fracturing fluid. A fracturing process which comprised crosslinking, guar-containing compositions on-the-fly with borate ions was described by Free in U.S. Pat. No. 3,974,077. The borate-crosslinked systems require a basic pH (e.g., 8.5 to 10) for crosslinking to occur.

Other crosslinking agents were developed using certain transition metals. Chrisp described certain of these systems in U.S. Pat. No. 3,202,556 and U.S. Pat. No. 3,301,723. In U.S. Pat. No. 3,202,566 aqueous solutions of galactomannan gums were crosslinked at a pH of from about 6 to 13 with crosslinking agents selected from the group consisting of compounds of antimony and bismuth. In U.S. Pat. No. 3,301,723 Chrisp described the use of certain titanium, zirconium, and other transition metals as crosslinking agents for galactomannan gums at a pH also in the range from about 6 to about 13. In both Chrisp patents, a basic pH was used to prepare crosslinked materials having utility in the explosive industry.

Another patent which described the use of titanium crosslinkers for solvatable polysaccharides was Tiner et al. (U.S. Pat. No. 3,888,312). The crosslinked gels formed by Tiner were said to be useful as fracturing fluids. The use of such crosinked gels was alleged to overcome the high friction loss experienced during the pumping of many high viscosity fracturing fluids previously known. This observation corroborated the disclosure by Chrisp in U.S. Pat. No. 3,301,723 at column 10 that crosslinked gels formed by using titanium, chromium, iron and zirconium crosslinkers had a high surface tension (i.e., stickiness and tackiness are absent), ready workability and other desirable physical characteristics.

Chrisp and Tiner et al. each described titanium crosslinkers in which the "amine" portion of the crosslinker was a residue of triethanolamine. Chrisp in U.S. Pat. No. 3,301,723 at column 5, line 60 identified the crosslinker as titanium-triethanolamine chelates. Tiner er al. in U.S. Pat. No. 3,888,312, column 3 at lines 32-35 identified the compound as bis(triethanolamine)bis(isopropyl)titanium (IV). Chrisp and Tiner at el. also disclosed a wide variety of other compounds in which the "anion" portion of the molecule was something quite different than the triethanolamine residue (e.g. chloride). Chrisp in U.S. Pat. No. 3,301,723 at column 4, lines 33-39 taught that the nature of the particular "anion" in the crosslinking agent was not critical but did have an influence on the solubility of the crosslinking compounds. Tiner et al. likewise taught that the crosslinking ability of their titanium crosslinking agent depended upon the presence of titanium in the +4 oxidation state and that the "anion" portion of the molecule could be carried. This broad teaching in Tiner et al. is once again analogous to the teaching in Chrisp.

As is well known, most such solvatable polysaccharides are typically crosslinkable in a basic aqueous medium (at a pH above 7) by a wide variety of organometallic compounds containing titanium or zirconium in a +4 oxidation (valence) state. These solvatable polysaccharides have a remarkable capacity to thicken aqueous liquids and thus to form gels. The crosslinked aqueous-base polysaccharide gels have been widely used as hydraulic fracture fluids for injection into subterranean formations to enhance the production of fluids therefrom. Hydraulic fracturing is a term applied to a variety of techniques used to stimulate the production of oil, gas and other fluids from subterranean formations. In hydraulic fracturing, a suitable fracture fluid is introduced into a subterranean formation by way of a wellbore under conditions of flow rate and pressure which are at least sufficient to create and/or extend a fracture into a desired part of the formation. The fracture fluid normally carries with it a proppant (e.g., sand, bauxite, glass beads, etc.) which is forced into the fracture and keeps the broken formation from closing down upon itself once the pumping pressure is released.

The organometallic crosslinking agents containing titanium or zirconium in a +4 valance state likewise form a known class of compounds. A preferred class of zirconium crosslinking agent is disclosed in British Pat. No. 2,108,122 (Kucera), the disclosure of which is incorporated herein by reference. This class of crosslinking agents is prepared by reacting zirconium tetraalkoxides with alkanolamines under essentially anhydrous conditions. Other zirconium and titanium crosslinking agents are described, for example, in U.S. Pat. No. 3,888,312 (Tiner et al.), U.S. Pat. No. 3,301,723 (Chrisp), and U.S. Pat. No. 4,460,751 (Hanlon et al.), U.S. Pat. No. 4,477,360 (Almond), and Europe Pat. No. 92,755 (U.S. application Ser. No. 371,022, filed Apr. 22, 1982 by Rummo et al.), the disclosures of which are incorporated herein by reference. In all such prior teachings of organometallic crosslinking agents which included an alkanolamine ligand, the molar ratio of alkanolamine to zirconium or titanium was below 5.

A problem has been encountered in the use of these titanium and zirconium crosslinking agents. Under conditions of use, the organometallic crosslinkers are generally dissolved in water prior to blending into the polysaccharide solution. It has now been discovered that the functional effectiveness of such organometallic compounds as crosslinking agents deteriorates over a period of time in the presence of water. This problem is particularly acute when aqueous solutions of the crosslinkers must be held in storage over a period of several hours at high ambient temperature (e.g., above about 80° F.).

SUMMARY OF THE INVENTION

In accordance with the present invention, it has now been discovered that aqueous solutions of zirconium and titanium crosslinking agents for solvatable polysaccharide solutions are stabilized by, and the functional effectiveness of such crosslinking agents is retained at least in significant part by, the inclusion of a small but stabilizing amount of an alkanolamine. These stabilized compositions are new compositions of matter.

The combination of a solvatable polysaccharide in a basic aqueous medium with the stabilized crosslinker solutions is also a new composition of matter which can be utilized in hydraulic fracturing as an improved fracture fluid. It has surprisingly been found that the crosslinked fluid is unusually resistant to shear degradation under conditions of use at elevated temperatures. Other conventional fracture fluid additives (e.g., proppant, gel stabilizers, or viscosity breakers) can also be included in the novel fracture fluid compositions.

DETAILED DESCRIPTION OF THE INVENTION

As noted above, the organometallic crosslinking agents containing titanium or zirconium in a +4 oxidation valance state form a known class of compounds, any member of which can be used herein provided the selected compound crosslinks solvatable polysaccharides in an aqueous medium at a basic pH. Those organometallic compounds containing one or more alkanolamine liqands are preferred in the present invention, and those compounds containing one or more ethanolamine (mon-, di- or triethanolamine) liqands are most preferred. The zirconium crosslinkers are preferred in many instances because of their "delayed" or "retarded" crosslinking reactivity. This delayed activity is useful in fracturing operations because it lets the operator formulate and pump the uncrosslinked fracture fluid while it has a relatively lower viscosity; this means lower hydraulic horsepower is required to pump the fluid, which means lower costs. The delayed systems are usually designed to crosslink while the fluid is being pumped through the wellbore tubing and/or as the fracture fluid enters the fracture. The velocity of the fracture fluid becomes lower as the fluid enters the fracture and the viscosity of the fluid must then be adequate to hold the proppant in suspension until the pumping (facturing) operations are complete. The zirconium crosslinkers described by Kucera are a most preferred class of crosslinkers for use herein.

In the present invention, the organometallic crosslinkers are dissolved in water and the aqueous solution thereof stabilized by adding at least one alkanolamine to the solution; the resultant solution is referred to herein as a stabilized crosslinker solution or composition. This stabilized crosslinker composition is combined in small but effective crosslinking amounts with an aqueous solution of solvatable polysaccharides so as to form first a crosslinkable fluid and then a crosslinked gel. This gel is useful as a fracture fluid in fracturing a subterranean formation penetrated by a wellbore using conventional techniques. In such fracturing operations, the stabilized hydraulic fracturing fluids of the present invention are introduced into the formation through the wellbore at a flow rate and pressure sufficient to create, reopen and/or extend a fracture in the formation. This may be accomplished by using either a batch mix or continuous mix technique. In the batch mix method the solvatable polysaccharide solution (and optional additives) is premixed in a tank. The stabilized crosslinker solution is then injected into a flowing stream of the aqueous polysaccharide solution and the combined fluid is pumped down the wellbore. In the continuous mix method the solvatable polysaccharide is added directly to a flowing stream of aqueous fluid and the crosslinker solution is added to this flowing stream at or near the wellhead after allowing sufficient residence time in the tubular goods for the polysaccharide to hydrate. Specific details of the hydraulic fracturing process will be known to those skilled in art, the novel aspect of which, in accordance with the present invention, is the utilization of a stabilized crosslinker composition in formulating an improved fracture fluid.

Crosslinking compositions in accordance with the present invention can also be utilized with solvatable polysaccharide solution including other additives such as viscosity modifiers or breakers, typically including alkali (i.e. alkali metal or ammonium) persulfate, as disclosed in U.S. Pat. No. 4,250,044; gel stabilizers, such as the alkali thiosulfate and ammonium thiosulfate, and methanol; proppant, such as sand, bauxite, glass beads, etc.

The solvatable polysaccharides with which the present invention may be used, particularly for applications such as fracture fluid, are those having a molecular weight of at least about 100,000. Normally polysaccharide molecular weights of about 1–5 million are preferred. The known class of solvatable polysaccharides referred to above includes, for example, locust bean gum and guar gum, as well as other galactomannan and glucomannan gums, such as those from endosperms of seeds of other leguminous plants such as the sennas, Brazilwood, Tera, Honey locust, Karaya gum and the like. Other examples include derivatives of such gums, such hydroxyethylguar, hydroxypropylguar, carboxyethylhydroxyethylguar, carboxymethylhydroxypropylguar, and the like. Cellulose derivatives containing only hydroxy/alkyl groups (e.g. hydroxyethylcellulose) are not crosslinked to any appreciable degree by zirconium/titanium crosslinkers and are, therefore, excluded from the class of polysaccharides useful herein. Guar gum, hydroxypropylguar, and locust bean gum are preferred polysaccharides for use in the present invention and hydroxypropylguar is the most preferred gum based upon its commercial availability and desirable properties. The solvatable polysaccharides can be used individually or in combination; usually, however, a single material is used.

A preferred subclass of polysaccharides includes those polysaccharides which have a plurality of vicinal hydroxyl groups oriented sterically in a cis configuration. This includes galactomannan gums, glucamannon gums, and other such hydrophilic vegatable gums, and certain cellulose derivatives. The solvatable galactomannan gums and glucomannan gums are, of couse, naturally occurring. However, the cellulose derivatives are reaction products of cellulose with compounds which render the cellulose derivatives solvatable and crosslinkable by the chemical attachment of hydrophilic constituents to the cellulose backbone. For example, the reaction product of alkali cellulose with sodium chloroacetate gives a product known as carboxymethylcellulose. Similarly, derivatives of the naturally occurring gums can be prepared and used herein so long as the derivatives thereof are solvatable and crosslinkable. For example, the reaction product of guar gum with propylene oxide gives a derivative known as hydroxypropylguar which is particularly useful herein.

The amount of alkanolamine used in the present invention can be varied, but generally the molar ratio of alkanolamine to titanium or zirconium is at least about 15 to stabilize aqueous crosslinker solutions, and at least about 42 to provide shear stability for the crosslinked gels at elevated temperatures (e.g., above about 200° F.).

This is well above the proportion of such alkanolamine to zirconium or titanium ratios in other crosslinking systems, such as for example that disclosed in U.S. Pat. No. 4,460,751 (Hanlon) wherein the upper limit of alkanolamine to zirconium is about 5 (column 6 lines 54–59).

In the present invention, the solvatable polysaccharides are normally blended with a solvent such as water or an aqueous medium (e.g., aqueous methanol, ethanol, or 1 to 3% HCl) to form an uncrosslinked gel as a first step. Like any chemical reaction, the rate of solvation of the particular polysaccharide vary with the particular combination of solvent and polysaccharide chosen. Because of this, it is generally advantageous to preblend the polysaccharide with the particular solvent medium to obtain a smooth uniform gel before blending in the crosslinker. As used herein, a "gel" is a homogenous or substantially homogeneous solid/liquid mixture in which the solid particles vary in size down to substantially colloidal dimensions and the mixture is capable of resisting a finite shearing force, such resistance to shearing is usually evidenced by viscosity measurements.

The amount of solvatable polysaccharide that is used in making a gel can vary in the instant invention. Usually only a small amount of polysaccharide is required because of the high efficiency that such polysaccharides display in thickening aqueous media. For most applications, satisfactory gels are made by adding the solvatable polysaccharide in amounts up to about 5 weight percent, based on the weight of the aqueous liquid. Preferred amounts of polymer generally range from about 0.3 to about 3 weight percent.

The aqueous medium is usually water or a water/alcohol mixture. The aqueous media can of course contain other additives which increase the rate of solvation of the polymer or perform some other desirable function. For example, the aqueous media may contain buffering agents, acids or bases, iron control agents, bactericides, diesel oil, chemical breakers which break the crosslinked polymers in a controlled manner, stabilizers, surfactants or formation control agents. Such additives may be added to the aqueous gel before or after the polysaccharide is solvated, but generally are added after.

It should be noted that the gels formed by blending the solvatable polysaccharide with an aqueous media are uncrosslinked gels. Such gels have an increased viscosity but they are substantially weaker than the crosslinked gels and the uncrosslinked gel structure can be broken (rather easily in most instances) by temperature, high shear, and/or the presence of dissolved electrolytes.

For more general information on solvatable polysaccharides and the use thereof as fracture fluids, reference is made to the *Handbook of Water-Soluble Gums and Resins* by Robert L. Davidson, editor, as published by McGraw-Hill, Inc. (1980). For an excellent treatise on water soluble polymers which includes a discussion on hydratable (or solvatable) polysaccharides, reference is also made to "Hydraulic Fracturing" by G. C. Howard and C. R. Fast, Monograph Volume 2, Henry L. Doherty Series, published by the Society of Petroleum Engineers (1970) which is an excellent introduction to the subject of hydraulic fracturing, even though it is now somewhat dated.

In accordance with the present invention, the stabilizing effect of the alkanolamines on an aqueous zirconium/titanium crosslinking composition and on a crosslinked polysaccharide composition has been demonstrated by the following examples and comparative tests.

EXAMPLE 1

Stabilization of crosslinker in aqueous solution

A 10 mL Control Sample of a zirconium/triethanolamine crosslinking agent in propanol media (prepared by reacting zirconium propoxide with triethanolamine in accordance with the above-referenced Kucera British patent) was added to 40 mL of deionized water prewarmed to test temperature. A series of tests were conducted on this Control Sample by maintaining solution prepared in this manner in water baths at various test temperatures for several hours. At regular intervals an aliquot of the crosslinker solution was withdrawn from the bath and its crosslinking reactivity evaluated by the following general procedure:

I. Add 0.6 mL of crosslinking solution to 200 mL of an aqueous solution containing 0.48 weight percent hydroxypropylguar (HPG), the equivalent of 40 pounds of HPG per 1000 gallons for formulated fluid, adjusted to pH 9.25.

II. Place the reaction vessel in a 140° F. water bath and stir the contents vigrously with a metal spatula until it becomes significantly harder to stir and mounding of the resulting gel occurs with stirring. This is designated as the thickening or crosslink time.

III. Record the thickening time.

A Test Sample of the present invention was then prepared by combining 10 mL of the Control Sample with 11 mL of triethanolamine and 29 mL deionized water. This provided a trialkanolamine to zirconium molar ratio of about 25:1 versus a ratio of about 4.7:1 in the Control Sample. Crosslink tests were then performed the same as for the control sample except that the gel pH was not adjusted (since the additional triethanolamine performed that function) and tests were conducted at higher temperature. Approximate crosslink times are reported below:

TABLE I

| Age (hrs) | Control at 85–90° F. | Control at 100° F. | Test Sample at 100° F. | Test Sample at 120–122° F. |
|---|---|---|---|---|
| 0 | 1 | 1 to 2 | 1.5 | 1.5 |
|  | 1 to 2 | 5 | — | 2 |
| 1 | 2 | 5 to 6 | 2 to 2.5 | 2.5 to 3 |
| 2 | 5 | 8 | 2 to 2.5 | 2.5 to 3 |
| 3 | 5 to 7 | 10 | 2 to 2.5 | 2.5 to 3 |
| 4 | 9 | 13 | 2.5 to 3 | 2.5 to 3 |
| 5 | 10 to 11 | — | — | 3 |
| 19 | — | — | 2.5 to 3 | — |
| 24 | — | — | — | 3 to 3.5 |

Field testing of crosslinker compositions stabilized in accordance with the present invention confirmed its advantages under conditions of use. In numerous instances where crosslinker compositions in accordance with the present invention were mixed and held at elevated ambient temperatures for several hours or overnight before use the mixture maintained its reactivity as evidenced by surface crosslinking tests and by successful treatment of the well. Crosslinker compositions containing the same active crosslinking agents which were previously in use were not similarly stable. It was necessary to discard and remix them if held more than 8 hours at 80° F. or more than 2 hours at 100° F.

EXAMPLE 2

Stabilization of crosslinked polysaccharide gel

Heat-induced gel breakdown, as indicated by viscosity loss, was tested as an indication of gel stability by using an HPG based gel system (0.48% or 40 pounds per 1000 gallons HPG in water). This gel also contained approximately 1% potassium chloride, an antifoam agent, bactericide, a surfactant and a conventional gel stabilizer as used in a commercial fracture fluid. Crosslinker solution was added through a mixer valve from a positive displacement syringe pump. The polysaccharide solution was pumped at 80 mL per minute and the crosslinker solution at 14.4 mL per hour. For the control, sodium carbonate was added to bring the pH to 9.5. This fluid was pumped through 360 feet of 0.08 inch I.D. stainless steel tubing and loaded through quick-connect fittings into a cup of a Fann 50 C viscosity measuring system rotating at 200 rpm. The crosslinker composition was a solution of 20% crosslinking agent, prepared as described in Example 1 and 80% water. The stabilized compositon of the present invention was produced either by adjusting the pH of the polysaccharide solution to 9.25 with triethanolamine and using a crosslinker solution comprising 20% crosslinking agent and 80% water described in Example 1 or by preparing a solution comprising 21–22% triethanolamine, 58–59% water, and 20% crosslinking agent.

A shear rate/shear stress scan (typically referred to as a ramp) from 85–511 reciprocal seconds (or 100–600 RPM with R1B5 cup and bob combination) was run 3 minutes after loading the Fann device. The heated baths were then raised to enclose the cup and the temperature of the test fluid raised to 275° F. Additional ramps were run at times of 0, 0.5 hour and 1 hour, and hourly thereafter. The results are shown in Table II.

TABLE II

| FANN 50C DATA AT 275° F., DUPLICATE TESTS | | | | | | | |
|---|---|---|---|---|---|---|---|
| CONTROL | | | | TEST | | | |
| Time (hrs) | Viscosity (at 170 sec −1) | n' | K' | Time (hrs) | Viscosity (at 170 sec −1) | n' | K' |
| Before Heat | 51 | .283 | .042 | Before Heat | 67 | .455 | .023 |
| 0 | 86 | .586 | .015 | 0 | 117 | .656 | .014 |
| 0.5 | 86 | .596 | .014 | 0.5 | 149 | .620 | .022 |
| 1 | 92 | .585 | .016 | 1 | 150 | .608 | .024 |
| 2 | 96 | .581 | .017 | 2 | 154 | .596 | .026 |
| 3 | 94 | .574 | .018 | 3 | 146 | .599 | .023 |
|  |  |  |  | 4 | 134 | .603 | .022 |
| Before Heat | 67 | .472 | .021 | Before Heat | 59 | .482 | .018 |
| 0 | 125 | .844 | .006 | 0 | 104 | .631 | .014 |
| 0.5 | 100 | .654 | .013 | 0.5 | 128 | .611 | .020 |
| 1 | 99 | .641 | .013 | 1 | 133 | .601 | .022 |
| 2 | 82 | .671 | .009 | 2 | 121 | .621 | .018 |
| 3 | 68 | .698 | .007 | 3 | 113 | .627 | .016 |
|  |  |  |  | 4 | 104 | .637 | .014 |

These results illustrate the surprising discovery that the stability of the crosslinked solvatable polysaccharide to shear and temperature is greatly enhanced by the inclusion of triethanolamine in the crosslinker composition or in the gel. Viscosities of the crosslinked fluids are significantly higher at test temperature than the viscosities of the control fluids without the added triethanolamine. In the field, this enhanced stability is corroboratd by successful treatments of wells at high temperatures with longer pump times and higher proppant concentrations and amounts than were previously possible with conventionally crosslinked and stabilized fluids.

EXAMPLE 3

Approximation of minimum effective amount of alkanolamine as stabilizer

To 10 mL aliquots of a Control Sample produced as described in Example 1, varying amounts of triethanolamine were added and the crosslink time (of a standard solvatable polysaccharide as described in Example 1) measured. In a control sample including an additional 5 mL of triethanolamine (alkanol to zirconium ratio equals 14), the crosslink time at 120° F. increased from about one minute, with a fresh crosslinker composition, to about four minutes at a crosslinker composition age of three to four hours and seven minutes at a crosslinker composition age of six hours. Corresponding experiments were conducted with crosslinking compositions further including additional triethanolamine in the amounts of 7, 9, 10, and 11 mL (alkanolamine to zirconium ratios of 17.7, 21.5, 23.3 and 25.2 respectively). The 9, 10 and 11 mL TEA compositions showed little increase in crosslink time as the crosslinking composition aged up to six hours at 120° F. Specifically, the crosslink time for these compositions increased from about one minute to about two-and-one-half minutes (for the 11 mL TEA sample). In contrast, the sample with 5 mL TEA composition showed a crosslink time increase to 7 minutes and the 7 mL TEA sample to 4 minutes crosslink time. This significant difference is believed to indicate that an alkanolamine to zirconium ratio of about 15 is sufficient to produce a discernible stabilizing effect in accordance with the present invention.

EXAMPLE 4

A test conducted with 0.48% guar gum solutions also demonstrates the unexpected stability imparted to the crosslinked polysaccharide by the use of triethanolamine in accordance with the present invention. The test procedure was the same as in Example 1 except that the test temperature was 200° F. For the control, the guar solution pH was adjusted to 9.25 with sodium carbonate. The test guar solution pH was brought to the same level with 0.8 mL/1000 mL (i.e., 0.8 gal/1000 gal triethanolamine). The crosslinker in both cases was a 20% aqueous solution of the crosslinking agent described in Example 1. Results are presented in Table III below

TABLE III

| Time (hrs) | Control | Test 1 | Test 2 |
|---|---|---|---|
| Before heat | 83 | 87 | 90 |
| 0 | 64 | 126 | 123 |
| 1 | 29 | 107 | 100 |
| 2 | 26 | 93 | 83 |
| 3 | 25 | 91 | 77 |
| 4 | 24 | 77 | 69 |

This data shows the dramatic reduction in sensitivity to shear and heat imparted by the use of triethanolamine in amounts in accordance with the present invention. It also shows that the amine can be added directly to the polysaacharide solution and produce the same beneifical effect as when added as part of the crosslinker solution.

This stabilizing effect converts what was at best a fluid of marginal utility into a useable fracturing fluid. Field testing confirms that fracturing treatments can successfully be performed using guar gum solutions crosslinked with the crosslinker compositions of the present invention.

EXAMPLE 5

Field testing of the stabilized crosslinker

As indicated earlier, the crosslinked fluids are useful as fracturing fluids. In a test conducted in summer in South Texas where surface temperatures ranged from 90°-100° F. a well was treated according to the present invention. The fracturing fluid utilized both the stabilized crosslinker and the high temperature gel stabilizer. Bottom hole static temperature (BHST) of the well was 295° F. and the perforated interval was at a depth of 11,452 to 11,486 feet. The fracturing fluid consisted of 55,00 gallons of 2% KCl water with 50 lb/1000 gal of HPG, 10 lb/1000 gal of ammonium thiosulfate stabilizer and appropriate amounts of the customary additives for fracturing fluids (bactericide, surfactants, clay stabilizer, silica flour fluid loss additive). Crosslinker was mixed in two separate batches—one for the pad fluid and one for the proppant stages. Crosslinker for the pad stage consisted of 20 gallons of crosslinking agent cited in the control in Example 1, 48 gallons of 85% triethanolamine and 15% water, and 32 gallons of water. Crosslinker for proppant stages consisted of 29 gallons of the same crosslinking agent, 69 gallons of the triethanolamine-water mixture, 47 gallons of water and 14 pounds borax (added to enhance early viscosity). Both crosslinker mixtures were added with a liquid additives pump on the discharge side of the blender at a rate such as to add 3.5 gallons crosslinker solution for every 1000 gallons of fracturing fluid. 20,000 gallons of pad fluid was followed by 35,000 gallons of proppant laden fluid, all fluids pumped at a rate of 10 barrels per minute (BPM). 80,000 lbs of 20/40 mesh Ottawa sand and 15,000 lbs of 20/40 mesh intermediate strength proppant were added during the proppant stages. Surface temperatures ranged from 90°-100° F. Although approximately 7 hours elapsed from the time crosslinker was mixed until completion of the treatment, the crosslinker remained active and showed no sign of deterioration (i.e., loss of activity) in surface tests. In addition, the job was pumped as scheduled wih surface pressure as expected. Surface monitoring showed no evidence of sand fallout or impending sand-out in spite of the high bottom hole temperature.

This successful field trial test demonstrated the operability and effectiveness of several aspects of the present invention under conditions of use. Namely, the stability of the crosslinker at high temperatures for extended periods of time and the effectiveness of the crosslinked gel as a fracturing fluid. The addition of borax to the fluid was also bveneficial in that it gave a high early viscosity (that assisted in carrying the proppant) without substantially increasing the friction pressure during pumping operations. The borax also functioned as a pH buffer and helped optimize the pH of the fluid. The borax was added on-the-fly, per Free cited above.

Borax is preferably added to the present fluids (aqueous gel compositions) in amounts of from about 0.1 to about 0.7 pounds per 1000 gallons of aqueous gel compositions; and is most preferably added in amounts of from about 0.25 to about 0.5 pounds per 1000 gallons.

What is claimed is:

1. A composition adapted to crosslink a solvatable polysaccharide in an aqueous media at a basic pH, said composition comprising an aqueous solution of (a) a crosslinking amount of an organometallic compound of zirconium in a +4 valence state and (b) a stabilizing amount of an alkanolamine corresponding to the formula $$R-N-(CH_2-CH(OH)-R')_2$$

wherein
R is H or $CH_2-CH(OH)-R'$ and
R' is H, $-CH_3$ or $-C_2H_5$, the molar ratio of said alkanolamine to said zirconium crosslinker being at least about 15.

2. A composition, as recited in claim 1, wherein said alkanolamine is an ethanolamine.

3. A composition, as recited in claim 2, wherein said alkanolamine is triethanolamine.

4. A composition, as recited in claim 1, wherein said molar ratio is at least about 42.

5. A crosslinkable, aqueous gel composition comprising a solvatable polysaccharide having a molecular weight of at least about 100,000 adapted to be crosslinked at a basic pH above 7 and a crosslinking amount of a composition as defined by claim 1.

6. A composition, as recited in claim 5, additionally comprising a particulate, solid proppant material.

7. A composition, as recited in claim 6, wherein said proppant material is sand, bauxite or glass beads.

8. A composition, as recited in claim 6, additionally comprising a breaker selected from the group consisting of an enzyme, an alkali persulfate and an ammonium persulfate.

9. A composition as recited in claim 6, additionally comprising a gel stabilizer selected from the group consisting of an alkali metal thiosulfate, an ammonium thiosulfate and methanol.

10. The composition defined in claim 5 additionally comprising borax.

11. The composition defined by claim 10 wherein said borax is added in amounts of from about 0.1 to about 0.7 pounds per 100 gallons of aqueous gel composition.

12. The composition defined by claim 11 wherein said borax is added in amounts of from about 0.25 to about 0.5 lbs/1000 gallons of aqueous gel composition.

13. A process for gelling a solvatable polysaacharide having a molecular weight of at least about 100,000 comprising blending an aqueous solution of the solvatable polysaccharide with a crosslinking amount of a composition as recited in claim 1.

14. In the process for fracturing a subterranean formation penetrated by a wellbore which comprises introducing a hydraulic fracturing fluid into said formation at a flow rate and pressure sufficient to create, reopen and/or extend a fracture in said formation, the improvement comprising using as said fracturing fluid one which comprises an aqueous solvatable polysaccharide having a molecular weight of at least about 100,000 and a crosslinking amount of a composition as recited in claim 1.

15. In the process for fracturing a subterranean formation penetrated by a wellbore which comprises introducing a hydraulic fracturing fluid into said formation at a flow rate and pressure sufficient to create, reopen and/or extent a fracture in said formation, the improvement comprising using as said fracturing fluid one which comprises an aqueous crosslinkable gel composition as recited in claim 10.

16. A process for fracturing a subterranean formation penetrated by a wellbore which comprises the steps of:
(a) substantially continuously injecting a crosslinking amount of a composition as recited in claim 1 into a flowing stream of aqueous solvatable polysaacharide having a molecular weight of at least about 100,000 to thereby form a flowing crosslinkable fracturing fluid;
(b) introducing the flowing crosslinkable fracturing fluid into the wellbore; and
(c) introducing said aqueous gelled fracturing fluid into said formation at a flow rate and pressure at least sufficient to create, reopen and/or extend a fracture in said formation.

17. A process as defined in claim 16 composition injected into said flowing stream of aqueous solvatable polysaccharide further comprises borax.

* * * * *